Aug. 20, 1929.  H. G. HILL  1,725,455
PRESSURE RELIEF SYSTEM
Filed Nov. 1, 1923
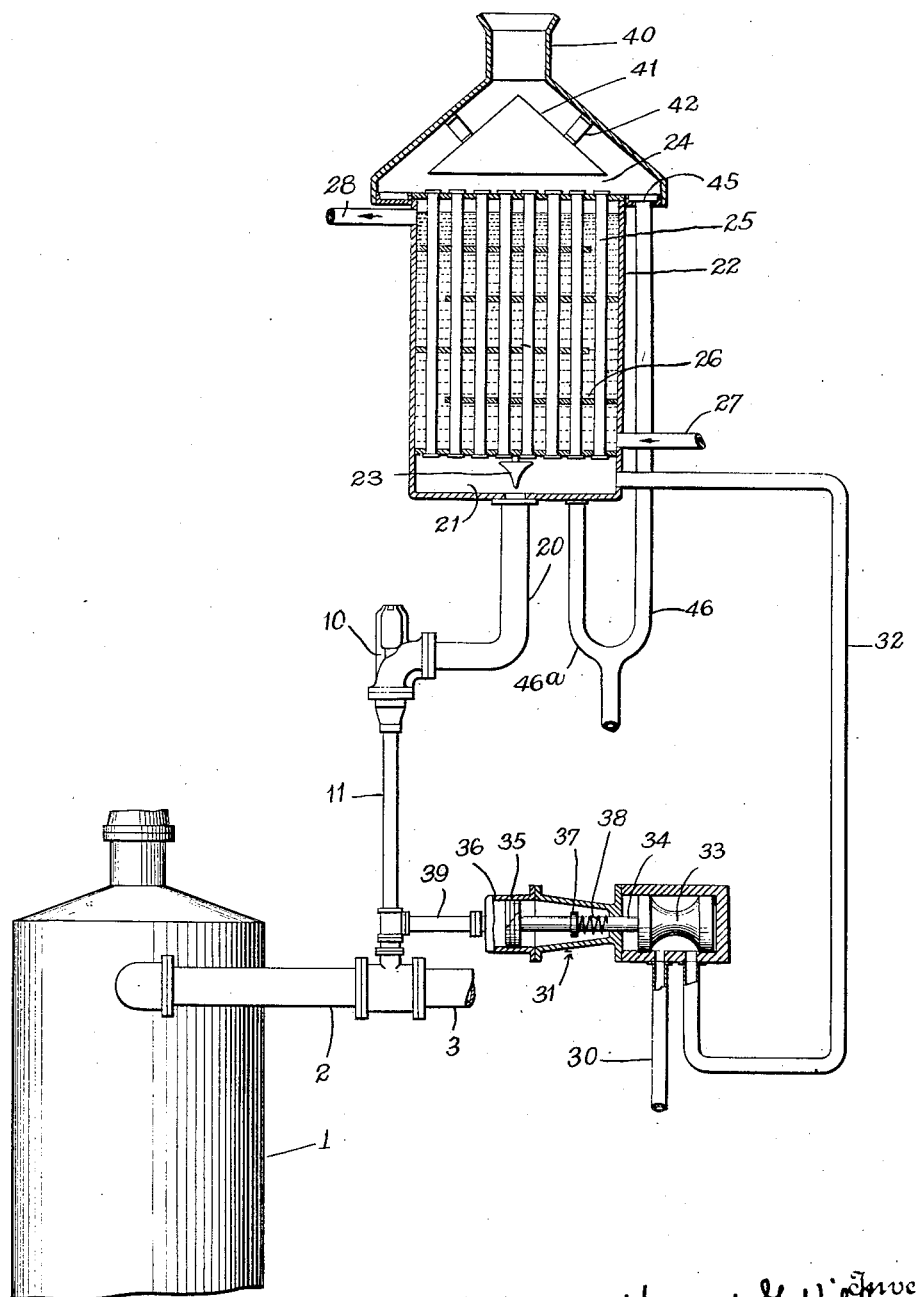
Howard G. Hill Inventor
By his Attorney Patented Aug. 20, 1929.

1,725,455

UNITED STATES PATENT OFFICE.

HOWARD G. HILL, OF ROANOKE, VIRGINIA, ASSIGNOR, BY MESNE ASSIGNMENTS, TO THE TEXAS COMPANY, OF NEW YORK, N. Y., A CORPORATION OF DELAWARE.

PRESSURE-RELIEF SYSTEM.

Application filed November 1, 1923. Serial No. 672,234.

This invention relates to high pressure relief systems and has particular reference to mechanisms for relieving the pressure of inflammable or explosive fluids and for effectually reducing danger of fire when such pressure is relieved.

It is one object of the invention to provide in combination with a high pressure still and a relief valve therefor an auxiliary mechanism operative at a pressure relatively less than the pressure for which the main relief valve is adjusted, the auxiliary mechanism functioning to inject a non-inflammable fluid into the chamber into which the main relief valve discharges.

Another object is to provide cooling means for said chamber.

Still another object is to provide a chamber into which the main relief valve discharges, of improved and efficient construction.

Other objects will appear from the following description of the invention taken in connection with the drawing, in which there is shown a view in side elevation, with certain parts cut away, of the elements making up a pressure relief system of my invention.

Referring to the drawing there is shown one embodiment of my invention applied to a high pressure still 1 having an outlet or vapor line 2 leading through the extension 3 to the usual condensers forming part of a distillation apparatus such as is employed in the refining of petroleum products and the like.

It is obvious that with high pressure stills such as those for which this invention is particularly adapted, the pipe lines 2 and 3 and the connections thereof are subject to relatively high pressure, and since the products of distillation within the still are of highly inflammable nature it is desirable that the pressure should not exceed some definite limit to which the still and connections may be safely subjected. For the purpose of definitely limiting the pressure there is provided a main relief valve such as 10 connected through the pipe connection 11 to the main vapor line 2, 3. As shown, the relief valve 10 takes the form of a relief valve described and claimed in the application of Fantz and Hill, Serial No. 466,858, filed May 4th, 1921, for relief valves (now Patent 1,533,640, dated April 14, 1925), but it is understood that any desired form of relief valve may be employed. Such relief valves are provided with adjustable means for predetermining the pressure at which the volatile fluid and gases shall be allowed to escape, this pressure being higher than that ordinarily obtained in the regular operation of the still 1 but lower than that which the still will safely withstand.

The outlet nozzle of the relief valve 10 discharges through a discharge pipe 20 into a mixing chamber 21 in the lower portion of a suitable vessel or container 22 preferably formed of metal and which is suitably reinforced in any desired manner. A deflector 23 is provided in the lower mixing chamber 21 for deflecting the gases as they emerge out of the tube 20. The vessel 22 is provided with a chambered hood 24 interconnected with the lower chamber 21 by means of a plurality of vertically disposed passages or tubes 25 and also with an outlet funnel 40 opening to the atmosphere. The chambered hood is provided interiorly with a hollow conical deflector 41 secured to the hood by the brackets 42. The vapors passing through the vertical tubes 25 are thus deflected by the cone and a portion at least of the condensable constituents are thrown out. There is a whirling movement within the hollow cone and the liquid portions are thrown outwardly by centrifugal action. If desired, a number of spiral deflectors may be disposed at the base of the cone to assist in throwing the liquid outwardly against the side of the hood.

The hood is provided with an annular pocket 45 which serves as a receiver for condensate and a draw-off line 46 is connected thereto for removing the condensate and delivering it to a suitable receptacle. The draw-off line 46 also has a branch line 46ª in open communication with the chamber 21 from which condensate is removed in a similar manner.

The intermediate portion of the vessel 22 between the chambers 21 and 24 is subdivided by a number of baffle plates 26 which may be of any suitable metallic material perforated for the passage of the vertical tubes 25 and alternately terminated at opposite end portions to form staggered spaces between the plates and the walls of the vessel, so as to provide a tortuous passage for a cooling liquid through said intermediate portion. The cooling liquid may be supplied through a supply pipe 27 communicating with a suitable reservoir or pump, and the liquid flows through the tortuous passage formed by the staggered baffle plates 26 and is discharged through an outlet passage 28, and may flow therefrom back to the reservoir or pump or may be allowed to escape.

A source of non-inflammable vapor such as steam or the like is connected by means of a steam pipe 30 to a valve 31. The outlet of the valve is connected by a suitable pipe 32 to the mixing chamber 21. The valve 31 comprises a balanced valve of the spool type 33 connected by means of a stem 34 to a piston 35 slidably mounted within a cylinder 36. The stem 34 is provided with a collar 37 and a compression spring 38, whereby the valve 33 is yieldingly held in its closed position to prevent the flow of steam from the passage 30 to the passage 32 under normal conditions.

The cylinder 36 is connected by means of a pipe 39 to the pipe connection 11 leading to the vapor line 2, 3, and the tension of the spring 38 is adjusted so that the piston 35 will only be actuated by the pressure of the gases within the vapor line when the pressure exceeds a predetermined value. This pressure is selected so as to be somewhat less than the pressure at which the relief valve 10 will be actuated, the difference in pressure being preferably about 25 pounds. The pressure for which the valve 31 is adjusted should also be somewhat above the ordinary pressures to which the vapor line 2, 3 is subjected in regular operation.

In ordinary operation of the still 1, the pressure relief system comprising the valves 10 and 31 and the vessel 22 and associated parts are not actively employed, and have no effect upon the refining operation. When, however, the pressure rises and exceeds the value for which the valve 31 is adjusted the piston 35 is moved towards the right, as shown in the drawing, and the spool valve 33 is thereby moved so that an open line is established from the steam pipe 30, through the valve and out through the pipe 32 to the mixing chamber 21. Steam or other vapor non-inflammable under ordinary conditions is then injected into the mixing chamber 21 and percolates through the tubes 25 into the chambered hood 24 escaping to the atmosphere through the upper exhaust funnel 40. When the pressure rises sufficiently to actuate the relief valve 10 the inflammable vapors escape through the passage 20 into the mixing chamber 21, where they mix with the non-inflammable vapor already present therein. The mixed vapors percolate through the tubes 25 into the chamber 24 and are exhausted to the atmosphere as before. The circulating cooling medium effectually limits the temperature of the mixed gases and prevents their escape at a dangerous temperature.

Thus it will be seen that there is provided effective means for preventing conflagration due to the escape of inflammable vapors. The automatic means for supplying non-inflammable fluid to prevent fire becomes effective in advance of the escape of the volatile gases and thus prepares the apparatus for preventing fire by driving out of the mixing chamber the air which is present therein.

Apparatus of preferred form and construction has been illustrated and described for the purpose of showing a way in which this invention may be practiced, but the inventive thought upon which this application is based is broader than this illustrative embodiment. It is therefore understood that the scope of the invention is not to be limited by the present disclosure, reference being had to the appended claims for that purpose.

What is claimed is:

1. In a pressure relief system for inflammable fluids, the combination with a main relief valve actuated by a predetermined excessive pressure to permit the escape of fluid, of an auxiliary valve adjusted to operate at a pressure relatively lower than said excessive pressure and arranged to apply non-inflammable fluid to the discharge opening of said first named valve.

2. In a pressure relief system for inflammable fluids, the combination of a mixing chamber, a valve operative when the pressure of said fluid exceeds a predetermined amount to admit non-inflammable fluid into said mixing chamber and a second valve operative when a relatively greater pressure is exceeded for establishing a path of escape for the inflammable fluid into said mixing chamber.

3. In a pressure relief system for inflammable fluids, the combination of a mixing chamber, a valve operative when the pressure of said fluid exceeds a predetermined amount to admit non-inflammable fluid into said mixing chamber; a second valve operative when a relatively greater pressure is exceeded for establishing a path of escape for the inflammable fluid into said mixing chamber, and means for cooling said chamber.

4. In a pressure relief system for inflammable fluids, the combination of a mixing chamber, a valve operative when the pressure of said fluid exceeds a predetermined amount to admit non-inflammable fluid into said mixing chamber, a second valve operative when a relatively greater pressure is exceeded for establishing a path of escape for the inflammable fluid into said mixing chamber, and means comprising a plurality of tubes for permitting the escape of the mixed fluids to the atmosphere.

5. In a pressure relief system for inflammable fluids, the combination of a mixing chamber, a valve operative when the pressure of said fluid exceeds a predetermined amount to admit non-inflammable fluid into said mixing chamber, a second valve operative when a relatively greater pressure is exceeded for establishing a path of escape for the inflammable fluid into said mixing chamber, means comprising a plurality of tubes for permitting the escape of the mixed fluids to the atmosphere, and means for cooling said tubes.

6. In a pressure relief system for inflammable fluids, the combination of a mixing chamber, a valve operative when the pressure of said fluid exceeds a predetermined amount to admit non-inflammable fluid into said mixing chamber, a second valve operative when a relatively greater pressure is exceeded for establishing a path of escape for the inflammable fluid into said mixing chamber, means comprising a plurality of tubes for permitting the escape of the mixed fluids to the atmosphere, means for cooling said tubes, and deflecting means positioned within said mixing chamber for deflecting the inflammable fluids escaping through the said second valve into intimate contact with the non-inflammable fluid.

7. In a pressure relief system for inflammable fluids, the combination with a high pressure still for producing volatile gases and a main relief valve operatively connected with the still actuated by a predetermined excessive pressure to permit the escape of said gases, of an auxiliary valve operatively connected with the still, adjusted to operate at a pressure relatively lower than the pressure of the relief valve and arranged to apply non-inflammable fluid to the discharge opening of said first named valve.

8. In a pressure relief system for inflammable fluids, the combination of a mixing chamber, a valve operative when the pressure of the fluids exceeds a predetermined amount to admit non-inflammable fluid into the mixing chamber, a second valve operative when a relatively higher pressure is exceeded for establishing a path of escape for the inflammable fluid into the mixing chamber, a chambered hood disposed above the mixing chamber and having an outlet port communicating with the atmosphere, a conical deflector disposed within the hood, and a plurality of tubular members in open communication between the mixing chamber and the chambered hood through which the mixed fluids pass.

9. In a pressure relief system for inflammable fluids, the combination of pressure responsive means for automatically releasing the inflammable fluid, a source of non-inflammable fluid, pressure responsive means for releasing the non-inflammable fluid, means for mixing the non-inflammable and inflammable fluids, means for separating the condensable constituents from the mixture, and means for removing the condensate.

10. In a pressure relief system for inflammable fluids, the combination with a pressure still for producing volatile gases, of a plurality of valves operatively connected with the still, and means for successively opening the valves to first release an atmosphere of steam and subsequently to release the excessive gases in the still into the atmosphere of steam.

11. The combination with a pressure still for producing volatile gases, of a pressure relief valve operatively connected with the still and adapted to be opened when a predetermined excessive pressure exists within the still, a second valve operatively connected with the still and adapted to be opened when a pressure relatively lower than that at which the first named valve is opened exists within the still, and arranged to apply non-inflammable fluid to the discharge opening of said first named valve prior to the opening thereof.

12. In a pressure relief system for inflammable fluids, the combination with a pressure still for producing volatile gases, of a chambered member, pressure responsive means for introducing non-inflammable fluid into the chambered member when a predetermined excessive pressure in the still is reached, a second pressure responsive means for subsequently establishing a path of escape for the inflammable fluids from the still into said chambered member to mix with the non-inflammable fluid therein, and means for cooling the mixture in said chambered member.

13. In a pressure relief system for inflammable fluids, the combination with a pressure still for producing volatile gases and a main relief valve operatively connected with the still and adapted to be actuated by a predetermined excessive pressure to permit the escape of excess gases, of a container connected with the discharge outlet of the relief valve, and an independent valve adapted to be actuated by the pressure exerted by the gases in the still and to open at a lower pressure than the relief valve to permit the entry of non-inflammable fluid into the container prior to the discharge into said container of the hot gases from the still.

14. In a pressure relief system for inflammable fluids, the combination with a pressure still for producing volatile gases of a pair of valves severally connected with the still and adapted to open successively in response to the increasing pressures exerted by the gases in the still, the opening of the valve set against the lower pressure being adapted to permit the discharge of a non-inflammable fluid to the discharge opening of the other valve and the subsequent opening of the other valve permitting the discharge of volatile gases into said non-inflammable fluid.

In witness whereof I have hereunto set my hand this 25th day of October, 1923.

HOWARD G. HILL.